United States Patent
Holmer

(10) Patent No.: US 9,621,902 B2
(45) Date of Patent: Apr. 11, 2017

(54) MULTI-STREAM OPTIMIZATION

(71) Applicant: GOOGLE INC., Mountain View, CA (US)

(72) Inventor: Stefan Holmer, Hagersten (SE)

(73) Assignee: GOOGLE INC., Mountain View, CA (US)

(*) Notice: Subject to any disclaimer, the term of this patent is extended or adjusted under 35 U.S.C. 154(b) by 189 days.

(21) Appl. No.: 13/780,893

(22) Filed: Feb. 28, 2013

(65) Prior Publication Data

US 2014/0241419 A1 Aug. 28, 2014

(51) Int. Cl.
| | |
|---|---|
| *H04N 19/154* | (2014.01) |
| *H04N 19/147* | (2014.01) |
| *H04L 29/06* | (2006.01) |
| *H04N 21/2343* | (2011.01) |
| *H04N 21/24* | (2011.01) |
| *H04N 19/196* | (2014.01) |
| *H04N 19/115* | (2014.01) |
| *H04N 19/124* | (2014.01) |
| *H04N 19/132* | (2014.01) |
| *H04N 19/14* | (2014.01) |
| *H04N 19/164* | (2014.01) |
| *H04N 19/166* | (2014.01) |
| *H04N 19/139* | (2014.01) |

(52) U.S. Cl.
CPC ....... *H04N 19/147* (2014.11); *H04L 65/4069* (2013.01); *H04L 65/605* (2013.01); *H04L 65/607* (2013.01); *H04L 65/80* (2013.01); *H04N 19/115* (2014.11); *H04N 19/124* (2014.11); *H04N 19/132* (2014.11); *H04N 19/14* (2014.11); *H04N 19/154* (2014.11); *H04N 19/164* (2014.11); *H04N 19/166* (2014.11); *H04N 19/196* (2014.11); *H04N 21/23439* (2013.01); *H04N 21/2402* (2013.01)

(58) Field of Classification Search
CPC ............ H04L 12/5695; H04L 47/808; H04W 52/241; H04W 28/06; H04N 21/23439; H04N 21/2662; H04N 21/44029
USPC ........................................ 375/240.01, 240.03
See application file for complete search history.

(56) References Cited

U.S. PATENT DOCUMENTS

| | | | |
|---|---|---|---|
| 6,421,387 B1 * | 7/2002 | Rhee ........................ | H04B 1/66 375/240.12 |
| 6,731,605 B1 * | 5/2004 | Deshpande ................... | 370/252 |

(Continued)

OTHER PUBLICATIONS

Wei Yao et al., "Joint Rate Allocation for Statistical Multiplexing in Video Broadcast Applications", IEEE Transactions on Broadcasting, vol. 58, No. 3, Sep. 1, 2012, pp. 417-427.

*Primary Examiner* — Obafemi Sosanya
(74) *Attorney, Agent, or Firm* — Birch, Stewart, Kolasch & Birch, LLP

(57) ABSTRACT

Methods and systems are provided for transmitting multiple video streams to clients based on individual preferences of the clients and network conditions. A cost-function minimization problem is formulated based on various network parameters. The network parameters (e.g., round-trip time (RTT), available bandwidth, packet loss rate, etc.) may be inputs to this optimization problem, which attempts to find optimal resolutions, bitrates, etc., given the network parameters and the video content. Additionally, by incorporating quality prediction, the cost-function may be based on actual content of video sequences.

7 Claims, 4 Drawing Sheets

(56) References Cited

U.S. PATENT DOCUMENTS

| | | | | |
|---|---|---|---|---|
| 2002/0196510 | A1* | 12/2002 | Hietala | .................. H04L 1/004 |
| | | | | 398/202 |
| 2007/0064797 | A1* | 3/2007 | Miao | .................. H04N 19/139 |
| | | | | 375/240.12 |
| 2008/0034396 | A1 | 2/2008 | Lev | |
| 2009/0086816 | A1* | 4/2009 | Leontaris | ............. H04N 19/154 |
| | | | | 375/240.03 |
| 2009/0219990 | A1* | 9/2009 | Han | ..................... H04L 1/0007 |
| | | | | 375/240.02 |
| 2013/0287312 | A1* | 10/2013 | Minezawa et al. | ........... 382/233 |
| 2013/0297743 | A1* | 11/2013 | Eschet | ................... H04L 65/60 |
| | | | | 709/219 |

\* cited by examiner

MULTI-STREAM OPTIMIZATION

TECHNICAL FIELD

The present disclosure generally relates to methods and systems for transmitting data. More specifically, aspects of the present disclosure relate to optimizing the transmission of multiple video streams based on the content of the streams.

BACKGROUND

When transmitting video in simulcast (e.g., where multiple versions of the same video stream are sent to a video conferencing server for distribution to clients) there is a need to decide what versions of the video to encode. Such a decision should be made with the receiving end-points in mind and also by taking into account the quality of the link between the sender and the conferencing server.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method comprising: analyzing a sequence of video frames to generate content metrics for the sequence of video frames; estimating a quality model based on the content metrics; determining parameters for encoding the sequence of video frames based on minimizing a cost function; and encoding the sequence of video frames using the parameters.

In another embodiment, the method further comprises estimating the cost function using the quality model.

In another embodiment of the method, the step of estimating the cost function includes computing a conditional probability density function based on the content metrics.

In yet another embodiment of the method, the step of minimizing the cost function includes maximizing a quality function.

In still another embodiment of the method, the step of determining the parameters for encoding the sequence of video frames includes determining bitrate and resolution that maximizes the conditional probability density function.

Another embodiment of the present disclosure relates to a method comprising: determining, based on one or more network parameters, a number of video streams to transmit to a server that minimizes a cost function over a plurality of receivers; determining a resolution for each of the video streams; and transmitting the number of video streams to the server for distribution to the plurality of receivers, wherein each of the video streams is transmitted at the resolution determined for the video stream.

In another embodiment, the method further comprises determining an amount of bandwidth to allocate to forward error correction for each of the video streams.

In one or more other embodiments, the methods presented herein may optionally include one or more of the following additional features: the quality model is a Gaussian mixture model; the quality function is a structural similarity metric; the structural similarity metric may be correlated to average motion vector magnitude, average spatial prediction error (SPE), and average block variance; the average SPE is computed as the difference between a pixel value and the average value of one or more neighboring pixels; the parameters for encoding include one or more of resolution, bitrate, and forward error correction rate; the cost function is a delay cost function; the cost function is a distortion cost function; the one or more network parameters include one or more of available bandwidth, round trip time (RTT), and packet loss rate; and/or the one or more network parameters further include maximum frame rate of each of the receivers.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
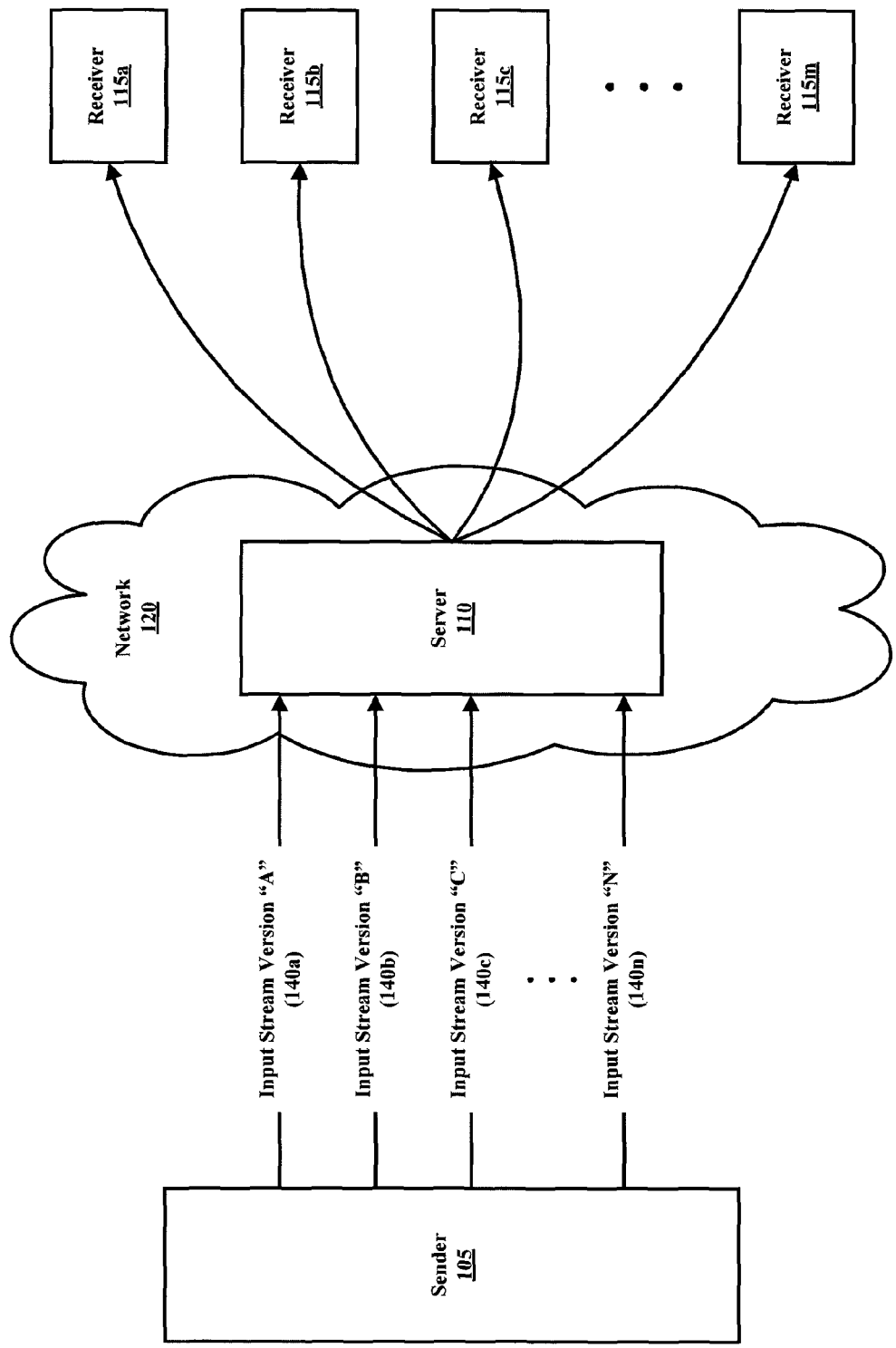
FIG. 1 is a block diagram illustrating an example communications system and surrounding environment in which one or more embodiments described herein may be implemented.

The headings provided herein are for convenience only and do not necessarily affect the scope or meaning of the claimed embodiments.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various embodiments and examples will now be described. The following description provides specific details for a thorough understanding and enabling description of these embodiments and examples. One skilled in the relevant art will understand, however, that the various embodiments described herein may be practiced without many of these details. Likewise, one skilled in the relevant art will also understand that the various embodiments described herein can include many other obvious features not described in detail herein. Additionally, some well-known structures or functions may not be shown or described in detail below, so as to avoid unnecessarily obscuring the relevant description.

Embodiments of the present disclosure relate to methods and systems for transmitting multiple video streams to clients based on individual preferences of the clients and network conditions. As will be described in greater detail below, a cost-function minimization problem may be formulated based on various network parameters. The network parameters (e.g., round-trip time (RTT), available bandwidth, packet loss rate, etc.) may be inputs to this optimization problem, which attempts to find optimal resolutions, bitrates, etc., given the network parameters and the video content. Additionally, by incorporating quality prediction, the cost-function may be based on actual content of video sequences.

An example scenario that may be used to describe various embodiments and features of the present disclosure involves simulcast transmission of video data, where N versions of the same input stream are sent to a server (which sometimes may be referred to herein as a "relaying conference server") that distributes the streams to M receivers (where "N" and "M" are arbitrary numbers). To optimize the use of available network resources in such a scenario, a determination may be made, at the sender, as to how many different versions of the input stream (N≤M) to transmit to the server, and what resolutions those transmitted streams should have.

FIG. 1 illustrates the example scenario presented above, in which a sender 105 may transmit, over a communications network 120, multiple versions of the same input stream to a server 110, which may distribute the streams to one or more receivers 115a, 115b, 115c, through 115m. For example, it may be determined at the sender 105 that optimal use of available network resources may be achieved by transmitting to the server 110 input stream version "A" 140a, input stream version "B" 140b, input stream version "C" 140c, through input stream version "N".

In accordance with at least one embodiment described herein, the optimization problem may also be solved at the relaying conference server (e.g., server 110 as shown in the example of FIG. 1). In one or more implementations, the relaying conference server knows the available bandwidth, RTT, and packet loss rates of all links to the receivers (e.g., receivers 115a, 115b, 115c, through 115m as shown in FIG. 1), and also knows the maximum resolutions/frame rates of all the receivers. However, the relaying conference server may not know what the video content looks like. Therefore, by optimizing using a cost function that does not depend on the video content (or, in accordance with at least one other embodiment, by transmitting the content metrics to the conference server), the optimization can easily be performed at the conference server. The conference server can then request what resolutions and forward error correction (FEC) protection the sending client should produce to best fit the receivers.

Problem Formulation

As will be further described below, one or more embodiments of the present disclosure may address the following example problem formulation: given a send-side available bandwidth $A_0$ and packet loss rate $p_0$ between a sender and a server, M receivers with receive bandwidth $A_i$ and packet loss rate $p_i$ between the server and each receiver, how many streams (e.g., video streams) should be transmitted to the server and at what resolutions? Additionally, the problem formulation may also include a determination of how much bandwidth should be allocated to FEC for each stream, denoted as $f_i$.

According to at least one embodiment, the following cost function minimization problem may be formulated:

$$\arg\min_{R_j, f_j, S} \Sigma_{i=1}^{m} C_{dist}(R_j, w_j, h_j, fr_j) + \beta C_{delay}(f_j, p_{avg,i}, RTT_{avg,i}, p_0) + \gamma R_j \quad (1)$$

where $S=\{(w_j, h_j, fr_j)\}$, and $|S|\leq M$. One illustrative way to interpret equation (1) is "find the number of streams |S| with the target video rates $R_j$, the target FEC rates $f_j$, and the video resolutions S that minimize the joint rate, distortion, and delay cost function over all of the receivers, while also ensuring that transmission occurs at a rate below the available send-bandwidth."

Equation (1), presented above, assumes that the FEC, $f_j$, is applied separately on each stream. However, it should be understood that, in accordance with one or more other embodiments, equation (1) may be modified slightly to model FEC applied jointly on all of the streams. In addition, it is important to note that the models presented herein assume that video streams which are missing packets are not decoded (e.g., error concealment is not performed). If a packet is missing, even after FEC reconstruction, it may be assumed that retransmission is needed, which is why the embodiments described herein include RTT as part of the suggested delay cost function.

Proposed Solution

The optimization problem described above and presented in equation (1) may be solved by finding approximations to the delay and distortion cost functions, both of which can be expected to depend on the particular content of a video sequence. For example, a video sequence with low motion is less likely to suffer significantly from short freezes, and such a sequence may be possible to encode with decent quality at a low rate.

It should also be noted that, in order to simplify things, content dependency may be left out of the optimization problem by using cost functions that are tuned to an estimated average video sequence. For example, the content-dependent parameters may be chosen as the average for a large set of a video conference clips.

Modeling—Regression

According to at least one embodiment, the optimization approach described herein may begin by estimating the delay and distortion cost function values given metrics of spatial and temporal complexity. For example, the structural similarity (SSIM) metric may be correlated to, among other measurements and combinations thereof, the average motion vector magnitude, the average spatial prediction error (SPE), and the average block variance as follows:

$$C_{dist}(R_j, w_j, h_j, fr_j) = 1 - SSIM(R, w, h) = f(R, w, h | SPE_{avg}, var_{avg}, |mv|_{avg}), \quad (2)$$

It should be understood that SSIM is a quality metric where a value closer to 1 represents higher quality while a value closer to 0 represents lower quality. Accordingly, an objective of the present optimization approach is to minimize $C_{dist}(R_j, w_j, h_j, fr_j)$.

In accordance with at least one embodiment, the average SPE may be computed as the pixel value minus the average of its four neighbors. For example, $$SPE_{avg} = pixel(x, y) - \left( \frac{pixel(x-1, y) + pixel(x, y-1) + pixel(x+1, y) + pixel(x, y+1)}{4} \right). \quad (3)$$

According to at least one embodiment, the metrics presented above may be analyzed over a set of video sequences to find the relationship between the metrics and the quality function (e.g., SSIM), given resolution and bitrate. Given that the SSIM may be approximated as a combination of the above metrics (that is, the average motion vector magnitude, the average SPE, and the average block variance), which is linear in the weights, the relationship may be approximated with a least squares estimator. It should also be noted that, in accordance with one or more other embodiments, Gaussian mixture model-based regression may also be used to approximate the relationship.

Depending on the implementation, the regression model described above may be adapted in real-time by having a video compression format known by those skilled in the art output the average SSIM or peak signal-to-noise ratio (PSNR).

For the sake of simplicity, one or more embodiments described herein may utilize a delay cost function (and, as described above, may also utilize a distortion cost function) that is independent of the content of the video sequence. For example:

$$C_{delay}(f_i, p_{avg,i}, RTT_{avg,i}, p_0) = E[\text{delay} | p_{avg,i}, p_0, f_i], \quad (3)$$

which may be simplified by assuming that the FEC is terminated at a conference server:

$$C_{delay}(f_i, p_0, RTT) = E[\text{delay} | f_i, p_0] = RTT(p_0 - f_i) \quad (4)$$

In accordance with one or more other embodiments, the model presented above in equations (3) and (4) may be extended to be content-dependent and also may utilize a more complex loss model. Furthermore, depending on the implementation, it may be possible to differentiate between delay, (irregular) freezes, and frame rate, thus allowing the trade-off between these parameters to be further clarified and manipulated.

Figure 2:
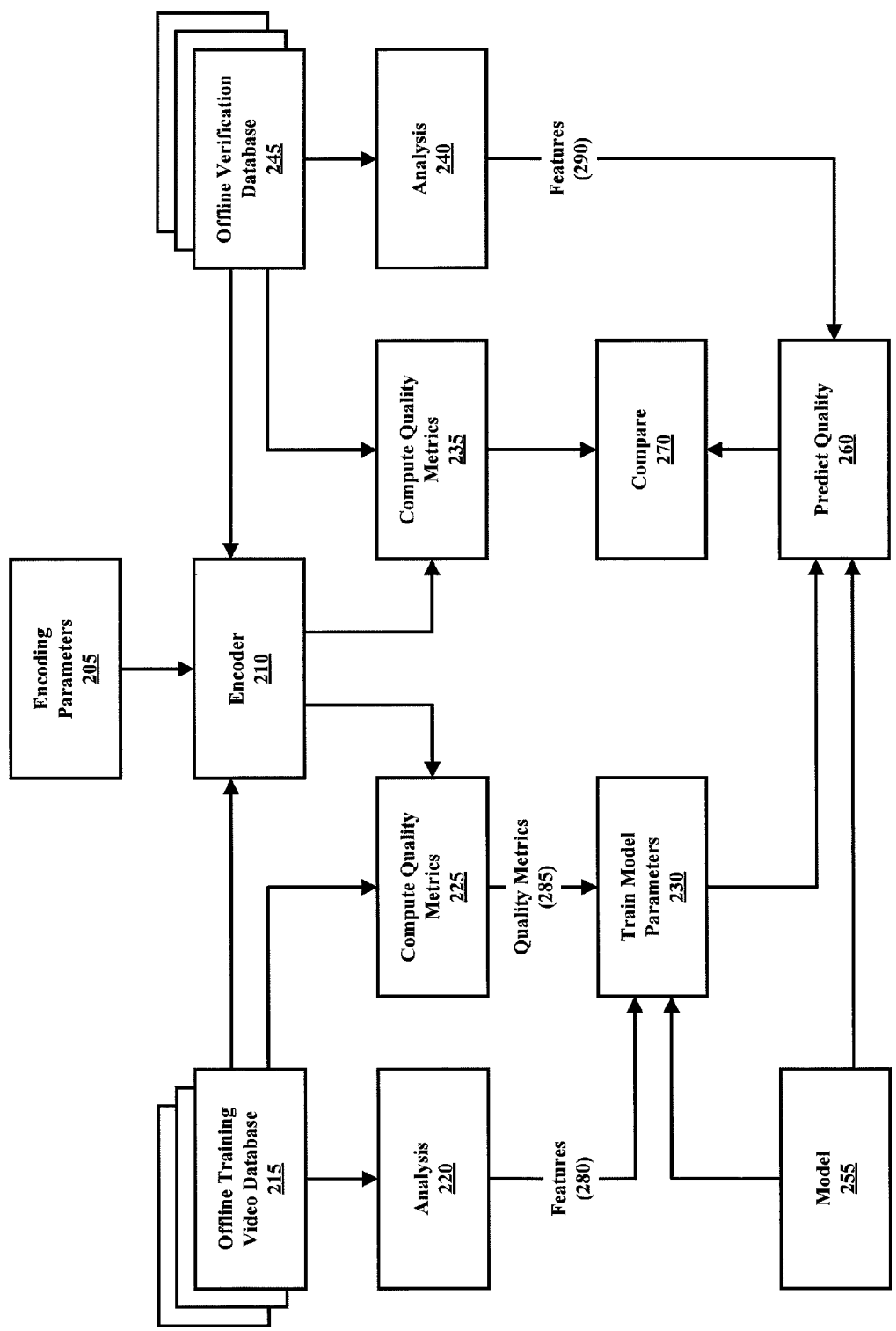
FIG. 2 is a block diagram illustrating an example method for building a multi-stream optimization model according to one or more embodiments described herein.

FIG. 2 illustrates an example process for building a multi-stream optimization model. In accordance with at least one embodiment, the process shown in FIG. 2 may be a routine for training the prediction model on a set of offline video clips.

An encoder 210 may be configured using a set of encoding parameters 205. For example, the set of encoding parameters 205 may include: {target bitrate 1, target bitrate 2, . . . , target bitrate N}×{resolution 1, resolution 2, . . . , resolution M} (where "N" and "M" are arbitrary numbers, and where "x" is the cross product, meaning "all combinations of"). It should be understood that, in accordance with one or more other embodiments, the set of encoding parameters 205 may also include one or more other parameters in addition to or instead of target bitrate and resolution parameters, as described in the above example.

The encoder 210 may receive a set of video sequences from an offline training database 215. Depending on the implementation, the set of video sequences received at the encoder 210 from the offline training database 215 may be very large. The encoder 210 may output encoded bitstreams, which may be decoded and used to compute one or more quality metrics (e.g., SSIM values) 225. For example, the decoded bitstreams may be used to compute quality metrics 285 by comparing the decoded sequences to the corresponding sequences in the offline training database 215. These same decoded sequences may also be analyzed 220 to compute one or more content metrics or "features" 280. The quality metrics (or SSIM values) 285 and the features 280 may be used to train (e.g., determine, adjust, etc.) the model parameters 230 which, for example, may be the weights in a linear model or the means and variances in a Gaussian mixture model 255.

The encoded bitstreams from the encoder 210 may also be decoded and used to compute one or more quality metrics 235 (which may, for example, be the same as or similar to quality metrics 285) from a separate offline verification database of video clips 245. The video clips from the offline verification database 245 may be analyzed 240 by computing one or more content metrics or features 290 (which may, for example, be the same as or similar to content metrics 280). From the features 290 and using the selected model 255 and its trained model parameters 230, a prediction of the quality 260 of each of the verification clips may be made. The process may then compare 270 the predicted quality to the quality computed in 235 (e.g., SSIM) to obtain a measure of how good the selected model 255 is. For example, the process may compute a mean square error of the model accuracy by computing the mean of the squared difference between the predicted qualities 260 and the computed qualities 235.

Figure 3:
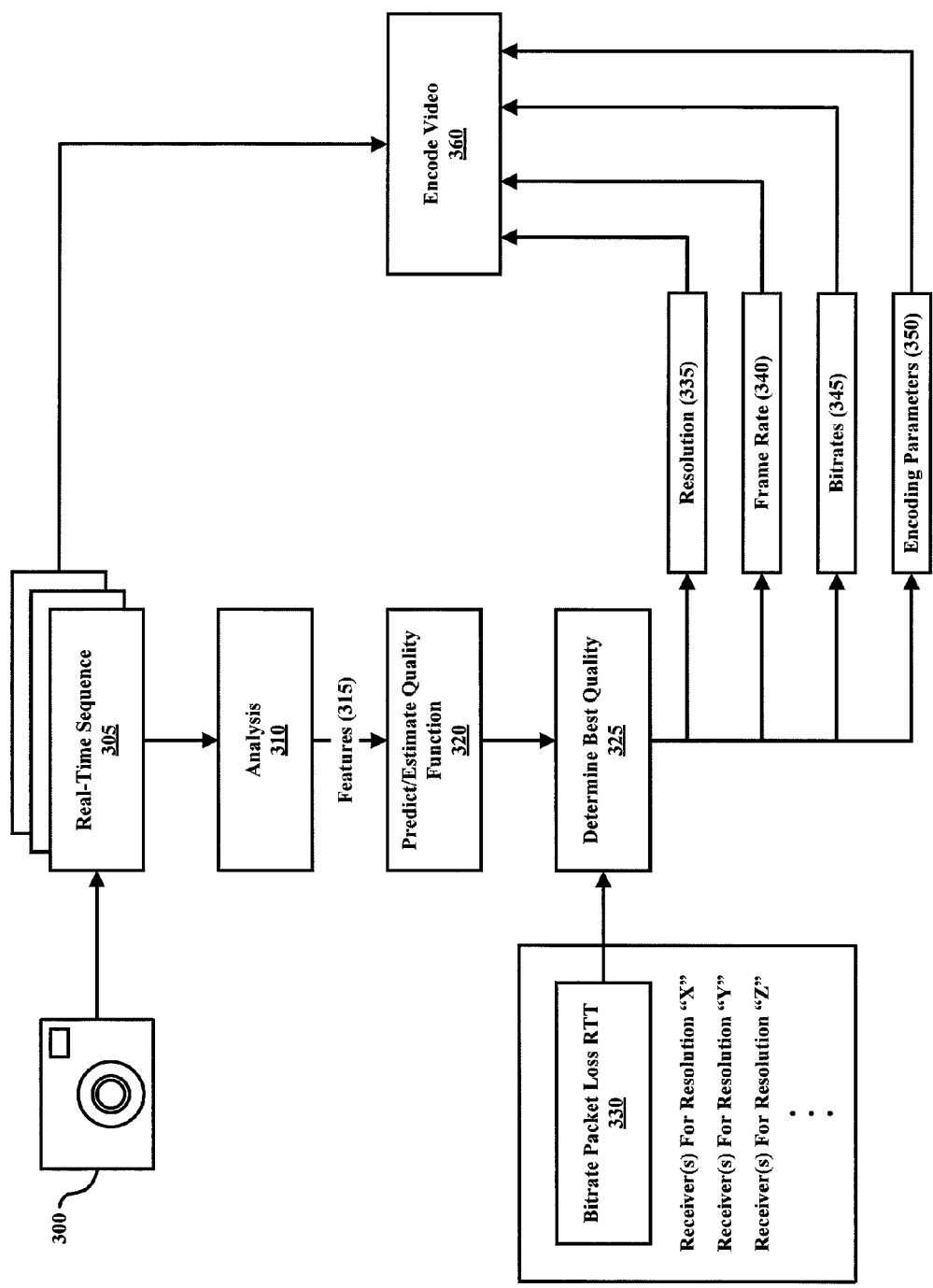
FIG. 3 is a block diagram illustrating an example method for optimizing the transmission of multiple video streams according to one or more embodiments described herein.

FIG. 3 illustrates an example process for optimizing the transmission of multiple video streams according to one or more embodiments described herein. For example, the process shown in FIG. 3 may describe how the trained model from the example process illustrated in FIG. 2 may be used in an application (e.g., a video application). As such, the following description may make reference to the example process of FIG. 2.

A camera 300 may capture a sequence of video frames 305. The video frames 305 may be analyzed 310 in a manner similar to the example process described above and illustrated in FIG. 2 (e.g., to get features 280, 290) to generate the features 315 of the sequence currently being captured. Depending on the particular implementation, the analysis 310 may be performed on each frame of the sequence, or may be performed less frequently (e.g., every other frame, every five frames, etc.).

The features 315 may be used to predict/estimate a quality function 320. In at least one example, the features 315 may be used with a model and corresponding trained model parameters (e.g., model 255 and trained model parameters 230 as shown in the example process of FIG. 2) to predict a quality function. For example, where a Gaussian mixture model is used, predicting the quality function 320 would include computing the conditional probability density function (conditional PDF) given the features 315. In such an instance, the conditional PDF would only be a function of resolution and bitrate.

At block 325, the cost function may be minimized to determine the best quality for the video sequence encoding (e.g., to get the best parameters for the video sequence to be encoded with). For example, where the Gaussian mixture model is involved, determining the best parameters at block 325 may be achieved by finding the bitrate and the resolution that maximizes the conditional PDF. Additionally, the bitrate packet loss RTT 330 may also be considered in this determination.

As shown in equation (1), presented above, the delay cost function may also be included in this minimization, in which case the output of the optimization may include an optimal resolution 335 (which may also account for frame rate 340), bitrates 345, FEC rate(s) and any other encoding parameters 350 the selected model may include. At block 360, the video sequence may be encoded using the optimal parameters (e.g., optimal resolution 335, FEC rate(s), etc.) determined at block 325.

Figure 4:
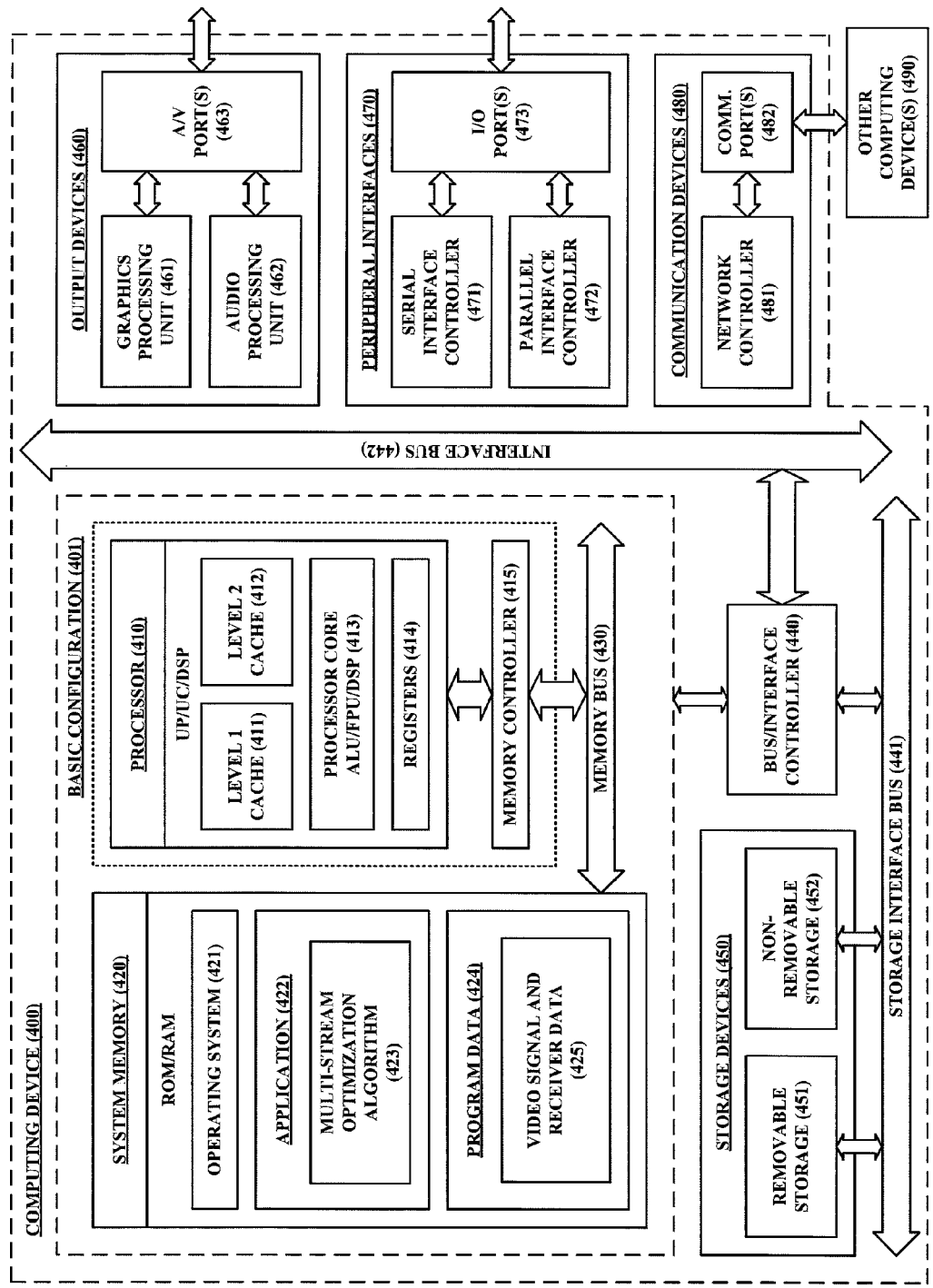
FIG. 4 is a block diagram illustrating an example computing device arranged for optimizing the transmission of multiple video streams according to one or more embodiments described herein.

FIG. 4 is a block diagram illustrating an example computing device 400 arranged for optimizing the transmission of multiple video streams in accordance with one or more embodiments of the present disclosure. In a very basic configuration 401, computing device 400 typically includes one or more processors 410 and system memory 420. A memory bus 430 may be used for communicating between the processor 410 and the system memory 420.

Depending on the desired configuration, processor 410 can be of any type including but not limited to a microprocessor (µP), a microcontroller (µC), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP Core), or any combination thereof. A memory controller 415 can also be used with the processor 410, or in some embodiments the memory controller 415 can be an internal part of the processor 410.

Depending on the desired configuration, the system memory 420 can be of any type including but not limited to volatile memory (e.g., RAM), non-volatile memory (e.g., ROM, flash memory, etc.) or any combination thereof. System memory 420 typically includes an operating system 421, one or more applications 422, and program data 424. In at least some embodiments, application 422 includes a multi-stream optimization algorithm 423 that is configured to determine the number of video streams that should be sent to a server, for distribution to receivers, such that optimal use is made of available network resources. The multi-stream optimization algorithm 423 is further configured to consider various network parameters (e.g., round-trip time (RTT), available bandwidth, packet loss rate, etc.) as inputs to an optimization problem, which attempts to find optimal resolutions, bitrates, etc., of the video streams to be transmitted to the server given the network parameters and the video content.

Program Data 424 may include video signal and receiver data 425 that is useful for determining the number of video streams that should be sent to a server so as to minimize the joint rate, distortion, and delay cost function over a group of receivers. In some embodiments, application 422 can be arranged to operate with program data 424 on an operating system 421 such that the video signal and receiver data 425 may be input to the multi-stream optimization algorithm 423 to determine the number of video streams, and the resolutions of the video streams, that should be sent to a server to optimize the use of available network resources.

Computing device 400 can have additional features and/or functionality, and additional interfaces to facilitate communications between the basic configuration 401 and any required devices and interfaces. For example, a bus/interface controller 440 can be used to facilitate communications between the basic configuration 401 and one or more data storage devices 450 via a storage interface bus 441. The data storage devices 450 can be removable storage devices 451, non-removable storage devices 452, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of computing device 400.

Computing device 400 can also include an interface bus 442 for facilitating communication from various interface devices (e.g., output interfaces, peripheral interfaces, communication interfaces, etc.) to the basic configuration 401 via the bus/interface controller 440. Example output devices 460 include a graphics processing unit 461 and an audio processing unit 462, either or both of which can be configured to communicate to various external devices such as a display or speakers via one or more A/V ports 463. Example peripheral interfaces 470 include a serial interface controller 471 or a parallel interface controller 472, which can be configured to communicate with external devices such as input devices (e.g., keyboard, mouse, pen, voice input device, touch input device, etc.) or other peripheral devices (e.g., printer, scanner, etc.) via one or more I/O ports 473.

An example communication device 480 includes a network controller 481, which can be arranged to facilitate communications with one or more other computing devices 490 over a network communication (not shown) via one or more communication ports 482. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency trade-offs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for transmission of one or more video streams to a plurality of clients, the method comprising:
   generating one or more content metrics for a sequence of video frames based on content contained in the video frames;
   estimating a quality function for the sequence of video frames using a regression model and the one or more content metrics;
   determining parameters for encoding the sequence of video frames by minimizing a joint delay and distortion cost function, wherein distortion cost is inversely related to the estimated quality function, and delay cost is based on round trip transmission time; and
   encoding the sequence of video frames using the determined parameters,
   wherein estimating the quality function includes computing a conditional probability density function based on the content metrics, the content metrics including at least bitrate and resolution,
   wherein determining the parameters for encoding the sequence of video frames includes determining the bitrate and resolution that maximizes the conditional probability density function.

2. The method of claim 1, further comprising: determining an amount of bandwidth to allocate to forward error correction for each of the one or more video streams.

3. The method of claim 1, wherein the regression model is a Gaussian mixture model.

4. The method of claim 1, wherein the quality function is a structural similarity metric that is approximated as a combination of average motion vector magnitude, average spatial prediction error, and average block variance for the sequence of video frames.

5. The method of claim 4, wherein the average spatial prediction error is computed as the difference between a pixel value and the average value of one or more neighboring pixels in the sequence of video frames.

6. The method of claim 1, wherein the quality function for the sequence of video frames is estimated using the regression model, the content metrics, and trained model parameters corresponding to the regression model.

7. The method of claim 1, wherein the parameters for encoding include one or more of resolution, bitrate, and forward error correction rate.

* * * * *